United States Patent [19]
Caveney et al.

[11] 3,906,593
[45] Sept. 23, 1975

[54] INTEGRAL CABLE TIE

[75] Inventors: Jack E. Caveney, Chicago; Roy A. Moody, Flossmoor, both of Ill.

[73] Assignee: Panduit Corporation, Tinley Park, Ill.

[22] Filed: Apr. 8, 1969

[21] Appl. No.: 814,252

[52] U.S. Cl.............................................. 24/16 PB
[51] Int. Cl.².................................... B65D 63/00
[58] Field of Search.......... 24/16 PB, 73.7, 30.5 PB, 24/73 PB, 30.5 P; 248/68, 74, 74 PB, 68 R

[56] References Cited
UNITED STATES PATENTS

| | | | |
|---|---|---|---|
| 3,009,220 | 11/1961 | Fein | 24/16 PB |
| 3,214,808 | 11/1965 | Litwin | 248/74 PB |
| 3,224,056 | 12/1965 | Joffe | 24/16 PB |
| 3,368,247 | 2/1968 | Orban | 24/16 PB |
| 3,484,905 | 12/1969 | Eberhardt | 24/16 PB |
| 3,486,201 | 12/1969 | Bourne | 24/16 PB |
| 3,494,002 | 2/1970 | Kabel | 24/16 PB |
| 3,542,321 | 11/1970 | Kahabka | 248/68 R |

*Primary Examiner*—Donald A. Griffin
*Attorney, Agent, or Firm*—Prangley, Dithmar, Vogel, Sandler & Stotland

[57] ABSTRACT

An integral one-piece cable tie including an elongated flexible strap having a row of teeth thereon, a frame integral with one end of the strap and having an abutment wall and an end wall and an entry surface and an exit surface and a strap-receiving opening extending therethrough, and a pawl pivotally mounted on the end wall within the opening and having a set of teeth thereon shaped complementary to the row of teeth, the pawl being limited to only pivotal movement with respect to the frame about the pivot connection to the end wall and being disposed entirely within the frame between the entry and exit surfaces thereof in all positions of the pawl.

6 Claims, 13 Drawing Figures

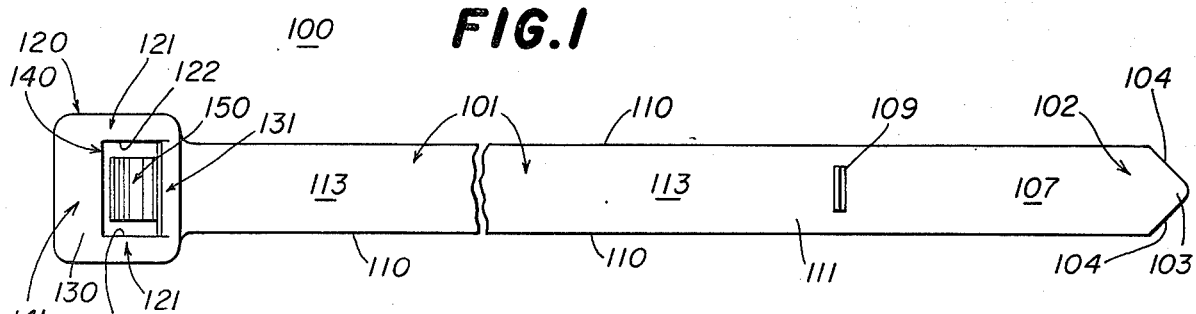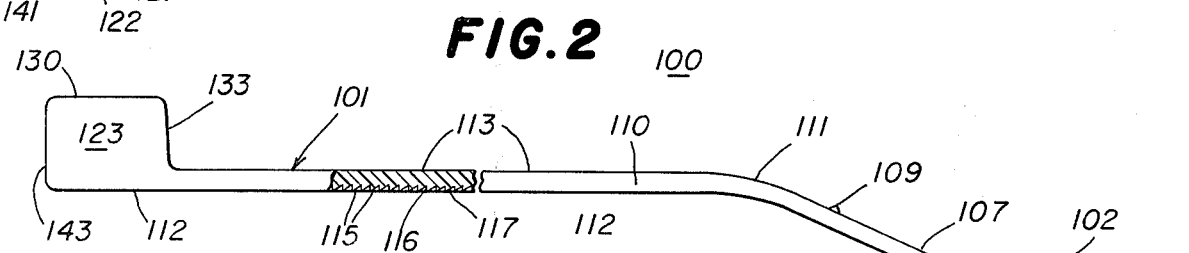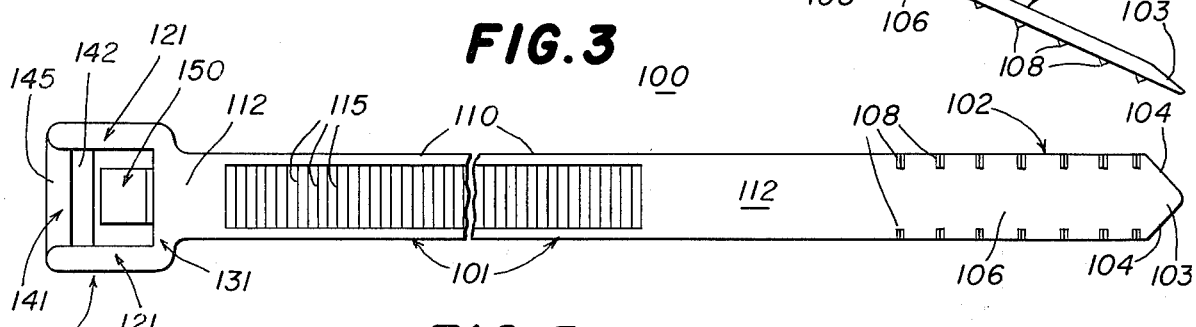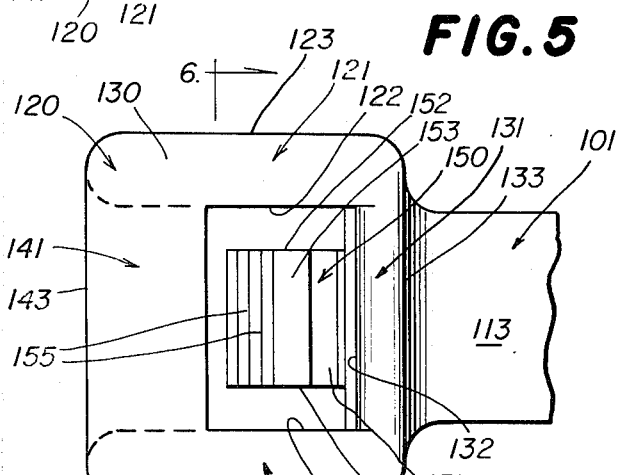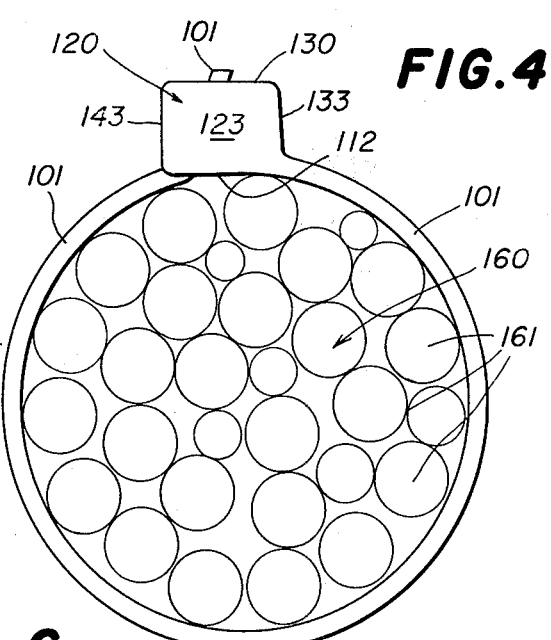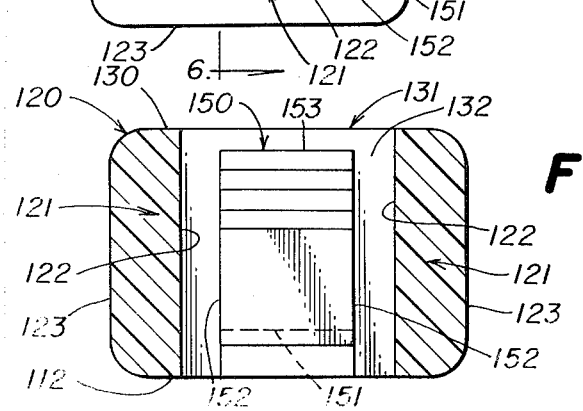
INVENTORS
JACK E. CAVENEY
ROY A. MOODY

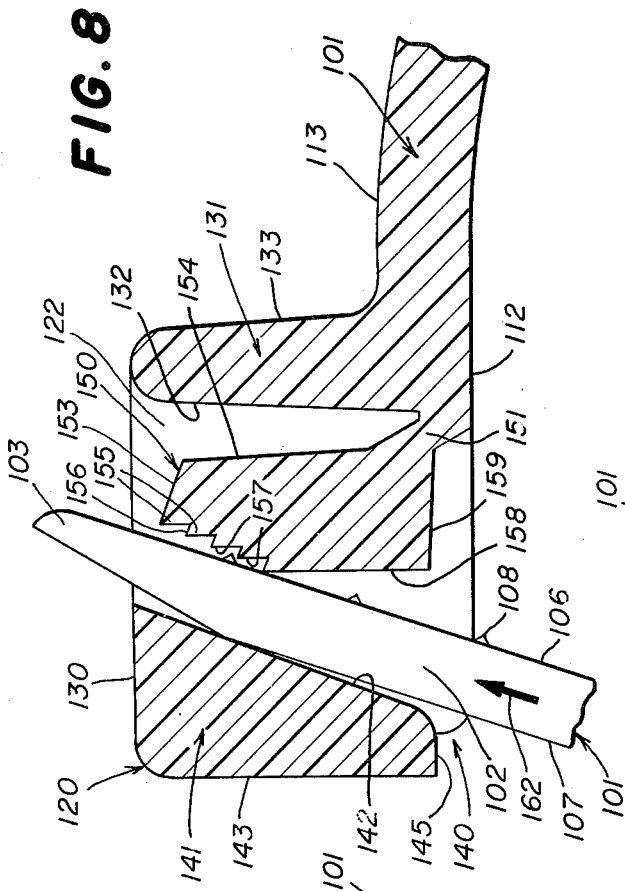
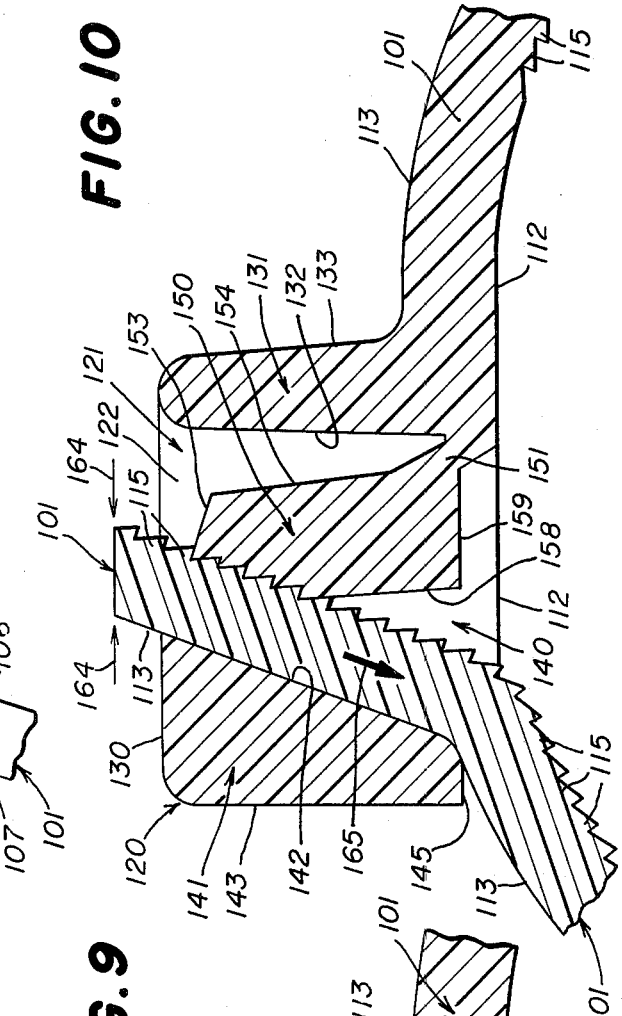
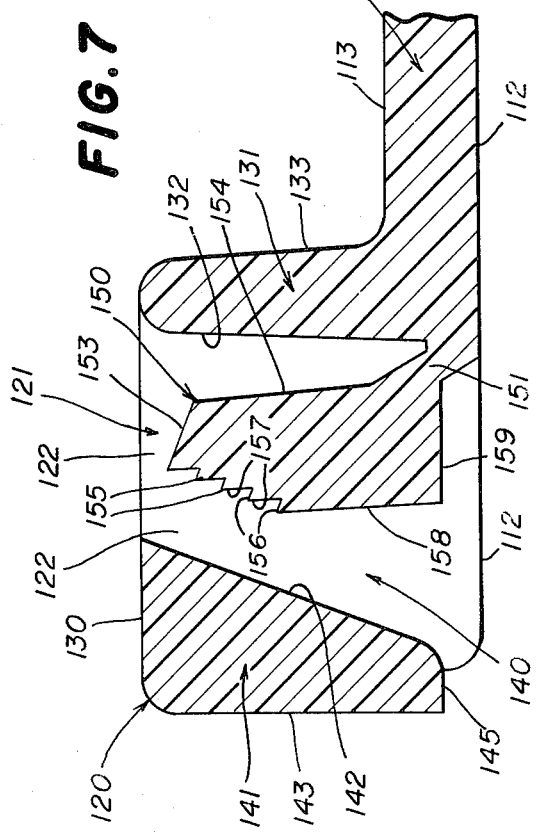
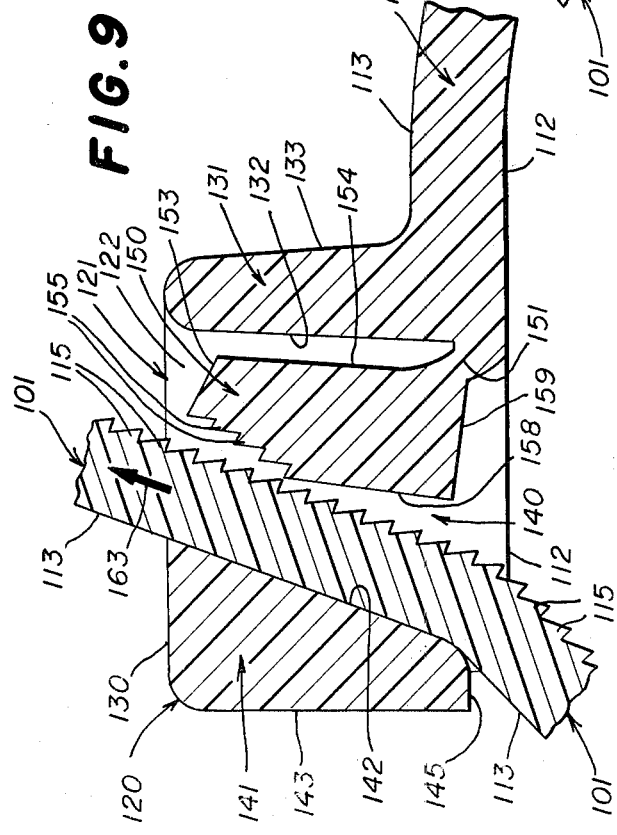

INTEGRAL CABLE TIE

The present invention is directed to an integral one-piece cable tie to be tensioned about a bundle of wires and the like, and particularly to such a cable tie wherein the pawl forming a part thereof is limited only to pivotal movement with respect to an associated frame within which it is disposed.

It is an object of the invention to provide an integral one-piece cable tie to be tensioned about a bundle of wires and the like comprising an elongated flexible strap having a row of teeth disposed on one longitudinal surface thereof, a frame integral with one end of the strap and including an end wall and an abutment wall and having an entry surface and an exit surface and a strap-receiving opening therethrough, a pawl disposed within the frame and pivotally mounted on and integral with the end wall, the pawl being limited to essentially only pivotal movement with respect to the frame about the pivot connection to the end wall, the pawl in the as-molded position thereof and in all other positions thereof including the tensioned position thereof being disposed entirely within the frame between the entry and exit surfaces thereof, the abutment wall having a strap-bearing surface disposed toward the pawl and defining therewith a strap-receiving throat, and a set of teeth on the pawl arranged transversely with respect thereto and disposed toward the abutment wall and shaped complementary to the row of teeth on the strap.

Another object of the invention is to provide a cable tie of the type set forth wherein the strap-receiving throat is disposed at an acute angle with respect to the as-molded longitudinal axis of the strap.

In connection with the foregoing object, another object of the invention is to provide a cable tie of the type set forth wherein the strap-receiving throat is inclined at an angle about 70° with respect to the longitudinal axis of the strap.

Another object of the invention is to provide a cable tie of the type set forth wherein the pawl is molded in the position in which it will be placed when the cable tie is tensioned about the associated bundle of wires.

A further object of the invention is to provide a cable tie of the type set forth wherein rails are provided to guide the strap adjacent to the strap-bearing surface of the frame during insertion of the free end of the strap into the frame.

Further features of the invention pertain to the particular arrangement of the parts of the cable tie, whereby the above-outlined and additional operating features thereof are attained.

The invention both as to its organization and method of operation, together with further objects and advantages thereof, will best be understood by reference to the following specification taken in connection with the accompanying drawings, in which:

FIG. 1 is a plan view with certain parts broken away of one embodiment of an integral one-piece cable tie made in accordance with an embodying the principles of the present invention;

FIG. 2 is a side elevational view with certain parts broken away of the cable tie of FIG. 1;

FIG. 3 is a plan view with certain parts broken away of the reverse side of the cable tie of FIGS. 1 and 2;

FIG. 4 is a view illustrating the cable tie of FIGS. 1 to 3 applied to a bundle of wires;

FIG. 5 is an enlarged fragmentary view of the head forming a part of the cable tie of FIGS. 1 to 3;

FIG. 6 is a view in vertical section along the line 6—6 of FIG. 5;

Figure 11:
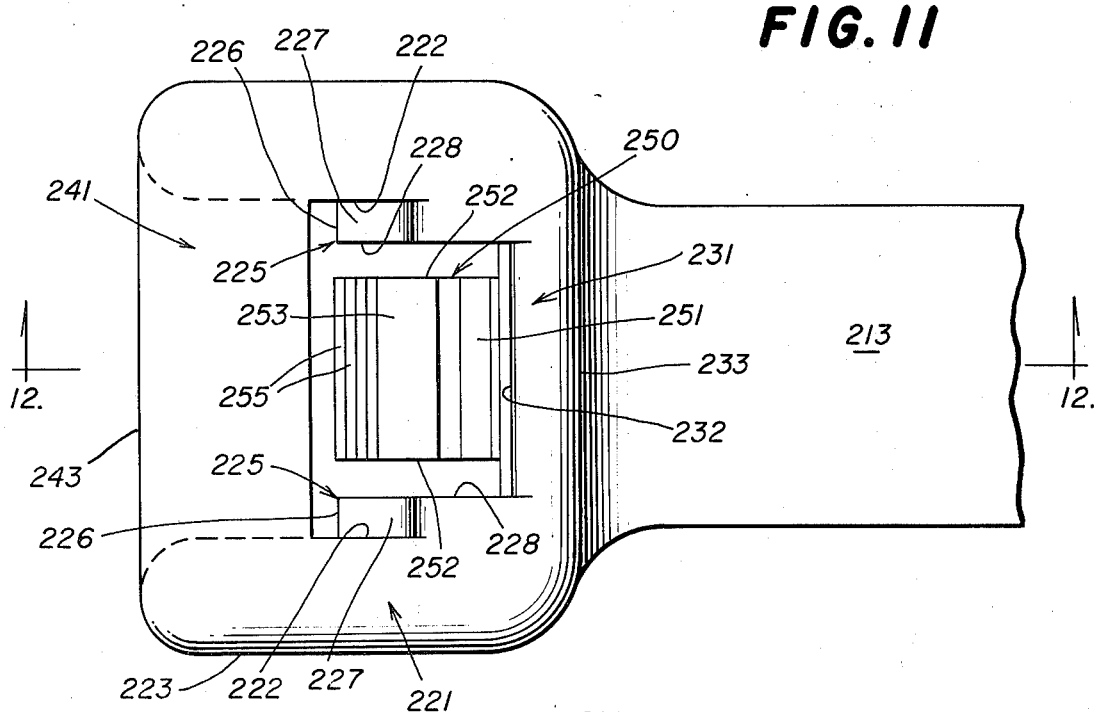
Figure 12:
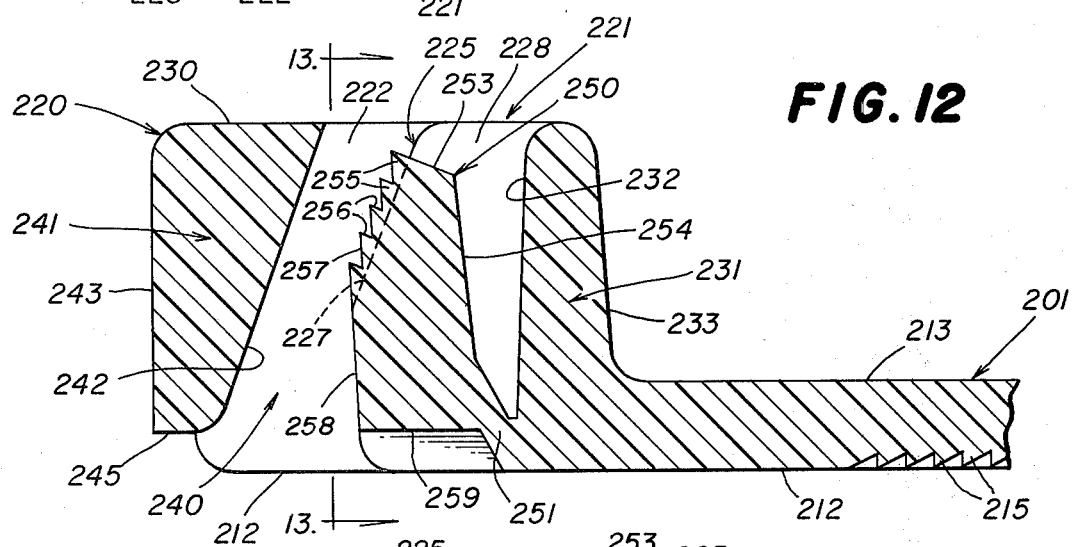
Figure 13:
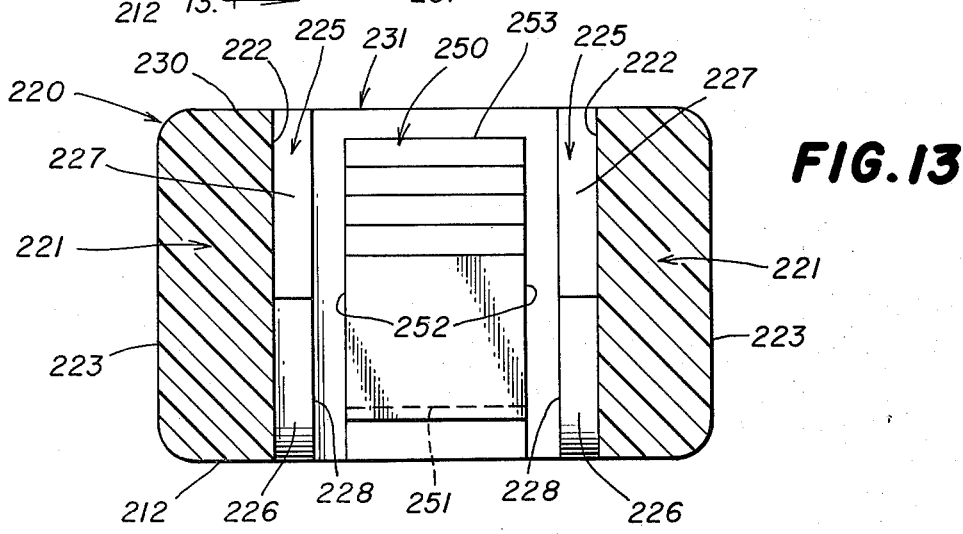

FIGS. 7 to 10, inclusive, are diagrammatical views illustrating the application of the cable tie about a bundle of wires;

FIG. 11 is a plan view with certain parts broken away of the head end of another embodiment of an integral one-piece cable tie made in accordance with and embodying the principles of the present invention;

FIG. 12 is a view in vertical section through the cable tie of FIG. 11 along the line 12—12 thereof; and FIG. 13 is a view in transverse section through the cable tie of FIG. 12 along the line 13—13 thereof.

Referring to FIGS. 1 to 3 of the drawings, there is shown an integral one-piece cable tie 100 made in accordance with and embodying the principles of the present invention. The cable tie 100 includes generally a strap 101 carrying on one end thereof a frame or head 120 having a strap-receiving opening or throat 140 therethrough in which is disposed a pawl 150. The cable tie 100 is typically used to bind a bundle 160 formed of a plurality of wires 161, and accordingly, the cable tie 100 has been illustrated in this end use in FIG. 4; however, it will be appreciated that the cable tie 100 can be advantageously used to bind other objects in a like manner.

The preferred material of construction of the cable tie 100 is a suitable synthetic organic plastic resin, the preferred resin being one of the polyamide resins; the resin must be sufficiently flexible to accommodate the deformation of the several parts of the cable tie 100 as illustrated throughout the drawings. It is an important object of the present invention that each of the parts of the cable tie 100 is integral with the adjacent parts thereof, whereby the cable tie 100 is truly one-piece and formed integral throughout.

The strap 101 is elongated and flexible and includes an outer end 102 that is deflected downwardly as viewed in FIG. 2 with respect to the remaining portion of the strap 101, the outer end 102 carrying thereon a tip 103 provided with tapered sides 104. The outer end 102 further has an inner or bundle-engaging surface 106 and an outer surface 107, the inner surface 106 carrying a plurality of transversely spaced-apart pairs of gripping projections 108 equidistantly spaced along the length of the outer end 102. A high ridge or detent 109 is provided on the outer surface 107 and is arranged transversely with respect thereto and adjacent to the juncture 111 between the outer end 102 and the remaining portion of the strap 101. In use, the detent 109 is caused to engage the strap 101 on the frame 120 temporarily in an encircling position with respect to an associated bundle 160, all as will be explained more fully hereinafter.

The strap 101 further includes a pair of longitudinally extending strap sides 110 which extend the length of the strap 101, and there is provided on the portion of the strap 101 disposed between the juncture 111 with the outer end 102 and the juncture with the frame 120 an inner or bundle-engaging surface 112 and an outer surface 113. Disposed in the surface 112 is a row of abutments or teeth 115, the teeth 115 being disposed in a recessed position with respect to the surface 112 and extending laterally of the strap 101 and having a length slightly less than the width of the surface 112, werey to be confined completely within the body of the strap 101. As illustrated, each of the teeth 115 has a shorter side 116 disposed substantially normal to the adjacent surface 112 and a longer or inclined side 117, see particularly FIG. 2.

The frame 120 is integral with the strap 101 and comprises a pair of side walls or members 121, a rear wall or member 131 and a front wall or member 141. As may be best seen in FIG. 6, the side walls 121 are laterally spaced apart and include inner surfaces 122 that extend the full height of the frame 120 and are disposed essentially parallel to one another, the inner surfaces 122 more specifically extending from the inner surface 112 which serves as an entry surface for the frame 120 to an exit surface 130 on top of the frame 120 as viewed in FIG. 6. The inner surfaces 122 further are spaced apart a distance slightly greater than the lateral distance between the strap sides 110, whereby the strap 101 may be received between the inner surfaces 122, all as will be explained more fully hereinafter. Each of the side walls 121 further includes an outer surface 123 that extends from the entry surface 112 to the exit surface 130.

The rear wall or end wall 131 includes an inner surface 132 and an outer surface 133, the inner surface 132 diverging downwardly away from the outer surface 133 from the exit surface 130 to the entry surface 112, whereby the rear wall 131 is thicker at the bottom thereof as illustrated in FIG. 7 than at the top thereof. As is best seen in FIG. 7, the strap 101 is joined to the frame 120 at the lower and thicker portion of the end wall 133.

The front wall or abutment wall 141 has an inner surface 142 which is spaced from the rear wall 131 in the direction opposite to the strap 101, the inner surface 142 being inclined upwardly toward the exit surface 130 and in the direction of the strap 101 and forming an angle of about 70 degrees with respect to the longitudinal axis of the strap 101 as molded, the rear wall 131 and the abutment wall 141 cooperating to provide therebetween a strap-receiving opening 140 which has the longitudinal axis thereof inclined and parallel to the strap-bearing surface 142. The front wall 141 also has an outer surface 143 which extends downwardly from the exit surface 130 and terminates a short distance away from the entry surface 112, and joins thereat a guide surface 145 which connects the inner surface 142 and the outer surface 143. More specifically, the guide surface 145 is spaced away from the entry surface 112 and together with the inner surfaces 122 on the side walls 121 defines a strap-receiving channel in the frame 120. The channel thus provided in the frame 120 and beneath the front wall 141 permits the frame 120 to lie more closely about the associated bundle 160 when the parts are in the tensioned condition as illustrated in FIGS. 4 and 10.

Mounted within the strap-receiving opening 140 in the frame 120 is the pawl 150, a hinge 151 of limited cross section serving integrally to interconnect the lower end of the pawl 150 to the rear wall 131 at the thicker portion thereof. The pawl 150 has a pair of side surfaces 152 disposed essentially parallel to one another (see FIGS. 5 and 6), the side surfaces 152 being spaced apart a distance slightly less than the transverse dimensions of the teeth 115 on the strap 101. The pawl 150 also has a top surface 153 (see FIG. 7) and a rear surface 154 disposed toward the inner surface 132. A set of teeth 155 is provided on the surface of the pawl 150 disposed toward the inner surface 142, the teeth 155 having a shorter side 156 and a longer side 157. The shorter sides 156 are disposed substantially normal to the inner surface 142 when in the as-molded condition as illustrated in FIGS. 7 and 10, it being pointed out that the tensioned condition and the as-molded condition of the pawl 150 are substantially identical. The crests of the teeth 155 all lie in a common plane that is essentially parallel to the opposed inner surface 142 on the front wall 141; and the roots of the teeth 155 of the pawl 159 also lie in a common plane substantially parallel to the inner surface 142. Furthermore, the crest-to-crest distance on the pawl teeth 155 is slightly less than the crest-to-crest distance on the strap teeth 115, whereby to insure that all of the teeth 155 in the pawl 150 engage teeth 115 on the strap 101, as will be explained more fully hereinafter.

The pawl 150 further has a front surface 158 that is disposed toward the strap-bearing surface 142 but spaced therefrom and disposed substantially normal to the entry surface 112. There further is provided a bottom surface 159 on the pawl 150 substantially normal to the front surface 158 and extending therefrom to the hinge 151. As illustrated, the hinge 151 is essentially rectangular in lateral cross section and directly mounts the lower adjacent edge of the pawl 150 on the lower adjacent portion of the end wall 131.

In use, the cable tie 100 is encircled about a bundle 160 of wires 161 as illustrated in FIG. 4. The frame 120 and the several parts associated therewith including the pawl 150 are shown in FIG. 7 in the as-molded condition and prior to the insertion thereinto of the strap 101. It will be noted that the crests of the teeth 155 lie in a plane that is essentially parallel to the inner surface 142 of the front wall 141. The outer end 102 carrying the gripping projections 108 is first inserted into the opening 140 through the frame 120 in the direction of the arrow 162 as illustrated in FIG. 8. The rows of projections 108 are spaced apart a distance greater than the width of the teeth 155 so that the projections 108 will not engage the teeth 155 during the insertion of the strap 101 into the frame 120. If desired, the detent 109 may be caused to engage the juncture between the exit surface 130 and the strap-bearing surface 142 temporarily to hold the strap 101 about a group of wires 161. In this manner, the workmen can continue to add wires 161 to the bundle 160 or remove wires 161 therefrom, as required, all before engagement of the strap teeth 115 with the pawl teeth 155.

Thereafter the user grasps the strap end 102 utilizing the projections 108 and pulls the strap further through the frame 120 in the direction of the arrow 163 in FIG. 9. Initial engagement between the strap 101 and the pawl 150 is with the lowermost one of the teeth 155, i.e., the tooth 155 disposed toward the entry surface 112, such engagement pivoting the pawl 150 in the clockwise direction as illustrated in FIG. 9, such movement of the pawl 150 being facilitated by the hinge 151.

During further tightening movement of the strap 101 as illustrated in FIG. 9, the teeth 115 of the strap 101 successively engage the lowermost one of the teeth 155 on the pawl 150, thereby to hold the pawl 150 generally in the position illustrated during tightening movement of the strap 101 through the frame 120. Preferably a tool such as that illustrated in the Caveney & Moody U.S. Pat. No. 3,169,560, granted Feb. 16, 1965, or that illustrated in the Caveney & Moody U.S. Pat. No. 3,254,680, granted June 7, 1966, is utilized to tighten the strap 101 about the bundle 160, which tool automatically at the end of the tightening operation severs the strap 101 at a point disposed beyond the exit surface 130 of the frame 120, such as is illustrated by the arrows 164 in FIG. 10.

Immediately after severing of the strap 101, the tension in the portion of the strap 101 about the bundle 160 tends to withdraw the strap 101 from the frame 120 in the direction of the arrow 165, i.e., in a retrograde or strap-withdrawal or strap-loosening direction. During such movement of the strap 101 relative to the frame 120, the tooth 115 disposed above the lowermost tooth 155 engages the lowermost tooth 155 and begins to pivot the pawl 150 in a counterclockwise direction from the position illustrated in FIG. 9 to that illustrated in FIG. 10. As the retrograde movement of the strap 101 continues, the teeth 155 above the lowermost tooth 155 progressively engage the teeth 115 of the strap 101, until all of the teeth 155 on the pawl 150 engage the adjacent ones of the teeth 115 on the strap 101. The parts finally arrive in the position illustrated in FIG. 10, the position of the pawl 150 in FIG. 10, which illustrates the tensioned condition of the parts, being essentially the same as that in the as-molded position illustrated in FIG. 7. With the parts in the position illustrated in FIG. 10, the strap 101 is firmly gripped between the abutment wall 141 and the pawl 150, and more specifically, the strap-bearing surface 142 on the abutment wall 141 is in firm engagement with the surface 113 of the strap 101 while certain of the teeth 115 on the strap 101 are in firm locking engagement with the teeth 155 on the pawl 150.

It is noted that in the desired operation of the pawl 150 during the insertion of the strap 101 into the frame 120, during the tensioning of the strap 101 about the bundle 160 and during the retrograde movement of the strap 101 to the final locked or tensioned position of FIG. 10, the pawl 150 is limited essentially only to pivotal movement with respect the frame 120 about the pivot connection provided by the hinge 151 to the end wall 131. It is further pointed out that the pawl 150 in the as-molded position thereof illustrated in FIG. 7 and in all of the other positions thereof including the flexed position of FIG. 9 and the tensioned position of FIG. 10 is disposed entirely within the frame 120 between the entry surface 112 and the exit surface 130 thereof. In other words, no part of the pawl 150 leaves the frame 120 during the application of the cable tie 100 about a bundle 160.

The channel in the front wall 141 provided by the surface 145 thereon and the inner surfaces 122 on the side walls 121 assists in the entry of the tip 103 into the throat 140 and also assists in permitting the frame 120 to lie more nearly flat against the associated bundle 160.

Once the parts are in the tensioned condition of FIG. 10, any force tending to withdraw the strap 101 from within the throat 140 in a strap-loosening direction serves to move the teeth 155 on the pawl 150 into a more firm engagement with the engaged ones of the teeth 115 on the strap 101, thereby firmly to grip the strap 101 between the strap-bearing surface 142 and the pawl 150. This described action prevents inadvertent withdrawal of the strap 101 from the frame 120, thus to lock the strap 101 in its tensioned condition about the bundle of wires.

Referring again to FIG. 7 of the drawings, it will be appreciated that the crests of the teeth 155 lie on a common surface, i.e., a plane, which common surface is disposed substantially equidistant from the strap-bearing surface 142 along the length thereof both in the as-molded condition of the parts, and also in the tensioned condition of the parts. It further is pointed out that the strap-bearing surface 142 extends beyond the teeth 155 both toward the entry surface 112 and toward the exit surface 130, thereby to provide a backing for the engaged portion of the strap 101 so that the engaged teeth 115 are encompassed thereby. All of the teeth 155 in the tensioned condition are engaged and loaded.

The planes defined by the surfaces of the teeth 155 disposed toward the entry surface 112, i.e., the surfaces 157 in FIGS. 7 and 10, converge with the planes defined by the surfaces of the pawl 150 disposed toward the exit surface 130, i.e., the surfaces 153 and 154, including the upper surface of the hinge 151. The two sets of planes named converge at points disposed on the exit side of the frame 120, convergence being at angles as small as zero degrees, i.e., the sets of planes might be essentially parallel. This configuration of these several surfaces permits the pawl 150 and the teeth 155 thereon to be properly molded as one-piece with the remaining portions of the cable tie 100.

Referring to FIG. 9 it will be noted that even in the most clockwise position of the pawl 150 with respect to the frame 120, there is ample clearance between the rear surface 154 of the pawl 150 and the inner surface 132 of the end wall 131, thereby to permit unrestricted flexure of the pawl 150 during insertion of the strap 101 into the frame 120. This feature is important to prevent damage to the teeth 155 on the pawl 150 during the insertion of the strap 101 through the head 120.

In a constructional example of the cable tie 100 for use with bundles having a diameter of 1.75 inches, the overall length thereof is 7.5 inches, the width of the strap 101 is 0.180 inch, the length of the tip 103 is 1.225 inches, the portion of the strap carrying the teeth 115 has a length of 5.67 inches, the depth of the teeth 115 is 0.010 inch and the pitch thereof is 0.025 inch, the inclination of the surfaces 117 to the surface 112 being 22°; the dimensions of the frame 120 in the direction of the strap 101 is 0.260 inch, the overall height of the frame 120 is 0.195 inch, the overall width of the frame 120 is 0.320 inch, and the inclination of the several surfaces 123, 132, 133, 143 and 154 is 3°; the surface 142 is inclined at an angle of 70° with respect to the entry surface 112 and with respect to the longitudinal axis of the strap 101 as molded; the thickness of the strap 101 is 0.040 inch, while the thickness of the hinge 151 is 0.030 inch with the axis thereof inclined at an angle of 60° with respect to the entry surface 112 and the longitudinal axis of the strap 101 as molded; the surfaces 156 of the teeth 155 are disposed substantially normal to the surface 142.

There is illustrated in FIGS. 11 to 13 of the drawings a second embodiment of an integral one-piece cable tie made in accordance with the present invention, the cable tie of FIGS. 11 to 13 being generally designated by the numeral 200. Many of the parts of the cable tie 200 are identical in construction to like parts in the cable tie 100 described above, and accordingly, there has been applied to each part of the cable tie 200 a reference numeral in the 200 series corresponding to the reference numeral in the 100 series that was applied to the like part of the cable tie 100 described above.

The fundamental difference between the cable tie 200 of FIGS. 11 to 13 and the cable tie 100 described above is the addition of rails designated by the numerals 225 in FIGS. 11 to 13. More specifically, the rails 225 are disposed on the inner surfaces 222 of the side walls 221, respectively, the rails 225 extending inwardly toward each other. Each rail 225 includes a lower surface 226 disposed substantially normal to the entry surface 212 and an inclined surface 227 extending upwardly from the surface 226 to the exit surface 230, the surfaces 227 being arranged essentially parallel to the surface 242 and essentially parallel to the planes defined by the crests and roots of the pawl teeth 255 in the as-molded position thereof. Finally, the rails 225 have inner surfaces 228 disposed toward each other and disposed parallel to each other and spaced from the pawl sides 252.

The rails 225 serve to guide the strap 201 along the surface 242 during insertion of the strap 201 into the frame 220, such movement of the strap 201 holding the strap 201 along a path which provides minimum interference between the teeth 215 and the teeth 255 during the insertion movement of the strap 201. In all other respects, the operation of the cable tie 200 is like that of the cable tie 100 described above.

From the above, it will be seen that there have been provided improved cable ties fulfilling all of the objects and advantages set forth above.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. An integral one-piece cable tie to be tensioned about a bundle of wires and the like, said cable tie comprising an elongated flexible strap, a row of teeth disposed on one longitudinal surface of said strap and arranged transversely with respect thereto, a frame integral with one end of said strap and including an end wall and an abutment wall, said frame having an entry surface and an exit surface and a strap-receiving opening extending therethrough, a pawl disposed within said frame in said strap-receiving opening and pivotally mounted on and internal with said end wall, said pawl being limited to substantially only pivotal movement with respect to said frame about the pivot connection to said end wall, said pawl in the as-molded position thereof and in all other positions thereof including the tensioned position thereof being disposed entirely within said frame between the entry and exit surfaces thereof, said abutment wall having a strap-bearing surface disposed toward said pawl and defining therewith a strap-receiving throat, and a set of teeth on said pawl arranged transversely with respect thereto and disposed toward said abutment wall and shaped to engage said row of teeth on said strap, said strap being deformable into a loop encircling a bundle of wires with the free end of said strap extending into said strap-receiving throat and through the opening in said frame and therebeyond, said set of teeth being disposed toward said row of teeth as said strap is tightened about the bundle of wires to a tensioned condition and release of said strap causing at least certain ones of said row of teeth firmly to engage said set of teeth, the crest-to-crest distance of said set of teeth being slightly less than the crest-to-crest distance of said row of teeth so that when the tooth in said set of teeth disposed toward said entry surface is the first to engage one of said row of teeth all of the teeth in said set of teeth will ultimately engage teeth in said row of teeth, any force tending to withdraw said strap from within said strap-receiving throat in a strap-loosening direction serving to move said set of teeth into more firm engagement with the engaged ones of said row of teeth firmly to grip said strap between said strap-bearing surface and said pawl, whereby to prevent inadvertent withdrawal of said strap from said frame and thus to lock said strap in its tensioned condition about the bundle of wires.

2. A cable tie to be tensioned about a bundle of wires and the like, said cable tie comprising an elongated flexible strap, a row of teeth disposed on one longitudinal surface of said strap and arranged transversely with respect thereto, a frame on one end of said strap and including an end wall and an abutment wall, said frame having an entry surface and an exit surface and an opening extending therethrough for receiving the other end of said strap, a pawl disposed within said frame in said strapreceiving opening and pivotally mounted on and integral with said end wall, said pawl being limited to substantially only pivotal movement with respect to said frame about the pivot connection to said end wall, said pawl in the as-molded position thereof and in all other positions thereof including the tensioned position thereof being disposed entirely within said frame between the entry and exit surfaces thereof, said abutment wall having a strap-bearing surface disposed toward said pawl and defining therewith a strap-receiving throat, and a set of teeth on said pawl arranged transversely with respect thereto and disposed toward said abutment wall and shaped to engage said row of teeth on said strap, said strap being deformable into a loop encircling a bundle of wires with the free end of said strap extending into said strap-receiving throat and through the opening in said frame and therebeyond, said set of teeth being disposed toward said row of teeth as said strap is tightened about the bundle of wires to a tensioned condition and release of said strap causing at least certain ones of said row of teeth firmly to engage said set of teeth, the crest-to-crest distance of said set of teeth being slightly less than the crest-to-crest distance of said row of teeth so that when the tooth in said set of teeth disposed toward said entry surface is the first to engage one of said row of teeth all of the teeth in said set of teeth will ultimately engage teeth in said row of teeth, any force tending to withdraw said strap from within said strap-receiving throat in a strap-loosening direction serving to move said set of teeth into more firm engagement with the engaged ones of said row of teeth firmly to grip said strap between said strap-bearing surface and said pawl, whereby to prevent inadvertent withdrawal of said strap from said frame and thus to lock said strap in its tensioned condition about the bundle of wires.

3. A cable tie to be tensioned about a bundle of wires and the like, said cable tie comprising an elongated flexible strap, a row of teeth disposed on one longitudinal surface of said strap and arranged transversely with respect thereto, a frame on one end of said strap and including an end wall and an abutment wall, said frame having an entry surface and an exit surface and an opening extending therethrough for receiving the other end of said strap, a pawl disposed within said frame in said strap-receiving opening and pivotally mounted on and integral with said end wall, said pawl being limited to essentially only pivotal movement with respect to said frame about the pivot connection to said end wall, said pawl in the as-molded position thereof and in all other positions thereof including the tensioned position thereof being disposed entirely within said frame between the entry and exit surfaces thereof, said abutment wall having a strap-bearing surface disposed toward said pawl and defining therewith a strap-receiving throat, rails respectively disposed on said frame adjacent to said end wall and extending into said strap-receiving opening at positions to guide said strap along a path adjacent to said strap-bearing surface, and a set of teeth on said pawl arranged transversely with respect thereto and disposed toward said abutment wall and shaped to engage said row of teeth on said strap, said strap being deformable into a loop encircling a bundle of wires with the free end of said strap extending into said strap-receiving throat and through the opening in said frame and therebeyond, said set of teeth being disposed toward said of row of teeth as said strap is tightened about the bundle of wires to a tensioned condition and release of said strap causing at least certain ones of said row of teeth firmly to engage said set of teeth, the crest-to-crest distance of said set of teeth being slightly less than the crest-to-crest distance of said row of teeth so that when the tooth in said set of teeth disposed toward said entry surface is the first to engage one of said row of teeth all of the teeth in said set of teeth will ultimately engage teeth in said row of teeth, any force tending to withdraw said strap from within said strap-receiving throat in a strap-loosening direction serving to move said set of teeth into more firm engagement with the engaged ones of said row of teeth firmly to grip said strap between said strap-bearing surface and said pawl, whereby to prevent inadvertent withdrawal of said strap from said frame and thus to lock said strap in its tensioned condition about the bundle of wires.

4. A cable tie to be tensioned about a bundle of wires and the like, said cable tie comprising an elongated flexible strap, a row of teeth disposed on the longitudinal surface of said strap that is disposed against the bundle of wires in use, said teeth being arranged transversely with respect to the longitudinal axis of said strap, a frame on one end of said strap and including an end wall and an abutment wall, said frame having an entry surface and an exit surface and an opening extending therethrough for receiving the other end of said strap, a pawl disposed within said frame in said strap-receiving opening and pivotally mounted on and integral with said end wall, said pawl being limited to essentially only pivotal movement with respect to said frame about the pivot connection to said end wall, said pawl in the as-molded position thereof and in all other positions thereof including the tensioned position thereof being disposed entirely within said frame between the entry and exit surfaces thereof, said abutment wall having a strap-bearing surface disposed toward said pawl and defining therewith a strap-receiving throat, and a set of teeth on said pawl arranged transversely with respect thereto and disposed toward said abutment wall and shaped to engage said row of teeth on said strap, said strap being deformable into a loop encircling a bundle of wires with the free end of said strap extending into said strap-receiving throat and through the opening in said frame and there-beyond, said set of teeth being disposed toward said row of teeth as said strap is tightened about the bundle of wires to a tensioned condition and release of said strap, causing at least certain ones of said row of teeth firmly to engage said set of teeth, the crest-to-crest distance of said set of teeth being slightly less than the crest-to-crest distance of said row of teeth so that when the tooth in said set of teeth disposed toward said entry surface is the first to engage one of said row of teeth all of the teeth in said set of teeth will ultimately engage teeth in said row of teeth, any force tending to withdraw said strap from within said strap-receiving throat in a strap-loosening direction serving to move said set of teeth into more firm engagement with the engaged ones of said row of teeth firmly to grip said strap between said strap-bearing surface and said pawl, whereby to prevent inadvertent withdrawal of said strap from said frame and thus to lock said strap in its tensioned condition about the bundle of wires.

5. A cable tie to be tensioned about a bundle of wires and the like, said cable tie comprising an elongated flexible strap, a row of teeth disposed on one longitudinal surface of said strap and arranged transversely with respect therto, a frame on one end of said strap and including an end wall and an abutment wall, said frame having an entry surface and an exit surface and an opening extending there through for receiving the other end of said strap, a pawl disposed within said frame in said strap-receiving opening and pivotally mounted on and integral with said end wall, said pawl being limited to substantially only pivotal movement with respect to said frame about the pivot connection to said end wall, said pawl in the as- molded position there of and in all other positions thereof including the tensioned position thereof being disposed entirely within said frame between the entry and exit surfaces thereof, said abutment wall having a strap-bearing surface disposed toward and said pawl and defining therewith a strap-receiving throat, and a set of teeth on said pawl arranged transversely with respect thereto and disposed toward said abutment wall and shaped to engage said row of teeth on said strap, said strap being deformable into a loop encircling a bundle of wires with the free end of said strap extending into said strap-receiving throat and through the opening in said frame and therebeyond, said set of teeth being disposed toward said row of teeth as said strap is tightened about the bundle of wires to a tensioned condition and release of said strap causing at least one of said row of teeth firmly to engage said set of teeth, the crests of a plurality of the teeth in said set of teeth being positioned opposite said strap-bearing surface in the tensioned condition of said strap with said strap-bearing surface extending beyond said pluarity of teeth, the crest -to-crest distance of said set of teeth being slightly less than the crest -to- crest distance of said row of teeth so that when the tooth in said set of teeth disposed toward said entry surface is the first to engage on of said row of teeth all of the teeth in said row of teeth will ultimately engage teeth in said row of teeth, any force tending to withdraw said strap from within said strap-receiving throat in a strap-loosening direction serving to move said tooth into more firm engagement with the engaged one of said row of teeth firmly to grip said strap between said strap-bearing surface and said pawl, whereby to prevent inadvertent withdrawal of said strap from said frame and thus to lock said strap in its tensioned condition about the bundle of wires.

6. An integral one-piece cable tie to be tensioned about a bundle of wires and the like, said cable tie comprising an elongated flexible strap, a row of autments diposed on one longitudinal surface of said strap and arranged transversely with respect thereto, a frame integral with one end of said strap and including an end wall and an abutment wall, said frame having an entry surface and an exit surface and a strap-receiving opening extending therethrough, a pawl disposed within said frame in said strap-receiving opening and pivotally mounted on and integral with said end wall, said abutment wall having a strap-bearing surface disposed toward said pawl and defining therewith a strap-receiving throat, and a tooth on said pawl arranged trasversely with respect thereto and disposed toward said abutment wall and shaped to engage said row of abutments on said strap, said frame having a channel in said entry surface through said abutment wall for receiving said strap therein to permit said frame to lie closed to the associated bundle of wires in the tensioned condition, said channel extending in a direction in longitudinal alignment with said strap and entirely through said abutment wall to receive said strap therein, said strap being deformable into a loop encircling a bundle of wires with the free and of said strap extending through said channel into said strap-receiving throat and through the opening in said frame and therebeyond, said tooth being disposed toward said row of abutments and engageable with successive ones thereof as said strap is tightened about the bundle of wires to a tensioned condition and release of said strap causing at least one of said abutments firmly to engage said tooth, any force tending to withdraw said strap from within said strap-receiving throat in a strap-loosening direction serving to move said tooth into more firm engagement with the engaged ones of said row of abutments firmly to grip said strap between said strap-bearing surface and said pawl, whereby to prevent inadvertent withdrawl of said strap from said frame and thus to lock said strap in its tensioned condition about the bundle of wires.

* * * * *

UNITED STATES PATENT OFFICE
CERTIFICATE OF CORRECTION

PATENT NO. : 3,906,593
DATED : September 23, 1975
INVENTOR(S) : Jack E. Caveney and Roy A. Moody It is certified that error appears in the above-identified patent and that said Letters Patent are hereby corrected as shown below:

Column 1, line 58, "an" should be --and--;

Column 4, line 10, "159" should be --150--;

Column 7, line 48, "internal" should be --integral--;

Column 10, line 27, "therto" should be --thereto--;

line 41, delete "and" first occurrence;

line 61, "on" should be --one--;

Column 11, line 7, "autments" should be --abutments--;

line 8, "diposed" should be --disposed--; and

Column 12, line 6, "and" should be --end--.

Signed and Sealed this seventeenth Day of February 1976

[SEAL]

Attest:

RUTH C. MASON
Attesting Officer

C. MARSHALL DANN
Commissioner of Patents and Trademarks

Disclaimer

3,906,593.—*Jack E. Caveney*, Chicago and *Roy A. Moody*, Flossmoor, both of Ill. INTEGRAL CABLE TIE. Patent dated Sept. 23, 1975. Disclaimer filed Oct. 10, 1984, by the assignee, *Panduit Corp.*

The term of this patent subsequent to May 9, 1989 has been disclaimed.
[*Official Gazette December 4, 1984.*]